United States Patent
Balakrishnan et al.

(10) Patent No.: US 8,140,825 B2
(45) Date of Patent: Mar. 20, 2012

(54) SYSTEMS AND METHODS FOR SELECTIVELY CLOSING PAGES IN A MEMORY

(75) Inventors: Ganesh Balakrishnan, Apex, NC (US); Anil Krishna, Cary, NC (US); Michael R. Trombley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 12/185,964

(22) Filed: Aug. 5, 2008

(65) Prior Publication Data
US 2010/0037034 A1 Feb. 11, 2010

(51) Int. Cl.
*G06F 12/00* (2006.01)
*G06F 9/26* (2006.01)
*G06F 9/34* (2006.01)
*G06F 15/00* (2006.01)
*G06F 7/38* (2006.01)
*G06F 9/00* (2006.01)
*G06F 9/44* (2006.01)

(52) U.S. Cl. .......................... 711/221; 712/228
(58) Field of Classification Search .................. None
See application file for complete search history.

(56) References Cited

U.S. PATENT DOCUMENTS

| | | | |
|---|---|---|---|
| 4,937,791 A * | 6/1990 | Steele et al. | 365/230.03 |
| 6,157,986 A | 12/2000 | Witt | |
| 6,233,668 B1 | 5/2001 | Harvey et al. | |
| 6,360,305 B1 * | 3/2002 | Novak et al. | 711/157 |
| 6,510,508 B1 | 1/2003 | Zuraski, Jr. et al. | |
| 6,631,440 B2 * | 10/2003 | Jenne et al. | 711/105 |
| 6,662,265 B1 * | 12/2003 | Kessler et al. | 711/105 |
| 2005/0177701 A1 | 8/2005 | O'Connor | |
| 2006/0026384 A1 | 2/2006 | Brandt et al. | |
| 2006/0212677 A1 | 9/2006 | Fossum | |
| 2009/0083741 A1 * | 3/2009 | Krishnan et al. | 718/102 |

FOREIGN PATENT DOCUMENTS
WO WO 2007/017683 A1 2/2007
* cited by examiner

*Primary Examiner* — Yaima Campos
(74) *Attorney, Agent, or Firm* — Yuanmin Cai; Khanh Tran

(57) ABSTRACT

Systems, methods and media for selectively closing pages in a memory in anticipation of a context switch are disclosed. In one embodiment, a table is provided to keep track of open pages for different processes. The table comprises rows corresponding to banks of memory and columns corresponding to cores of a multi-core processing system. When a context switch signal is received, the system unsets a bit in a column corresponding to the core from which the process is to be context-switched out. If no other process is using a page opened by the process the page is closed.

20 Claims, 12 Drawing Sheets

SYSTEMS AND METHODS FOR SELECTIVELY CLOSING PAGES IN A MEMORY

BACKGROUND

This written description is in the field of managing computer memory resources. More particularly, the description relates to selectively closing pages in a memory.

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, and accounting. Further, networks enable high speed communication between people in diverse locations by way of e-mail, websites, instant messaging, and web-conferencing.

A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

Thus, in a modern system, a plurality of computers—including servers—are connected together through a network. Each computer may run application programs for performing certain functions. These application programs may include word-processing, e-mail, graphics, document viewing and mark-up, spreadsheet, database, music player, internet browser, photo-shop, games, anti-virus, as well as a host of other application programs too numerous to mention.

In a single processor computer system or a multi-processor computer system, where the Memory Controller (MC) uses Open Page policy for managing memory pages, it is possible that when the Operating System (OS) context switches from one process to another, the following may occur: (1) The memory pages opened by the exiting process will not be used by the incoming process, or (2) Several of the memory pages opened and used by the exiting process will be used by the same process the next time it is scheduled to run on the processor by the OS. Memory controllers are typically unaware of any OS level paradigms such as Process Identifier (PID) or the occurrence of a context switch. This lack of awareness potentially poses a performance issue.

When a process is context switched to execute on the processor, it will find pages in the open state in the memory which are different than the pages it needs to access for the process that the processor switches to. The probability of this happening increases as the number of contexts the OS must schedule increases. The probability of this happening also increases when the contexts have several pages they work with simultaneously, but do not share many pages with other contexts. In such a scenario, when a process is context switched in, it will likely find a page conflict every time it wants to access a new physical page, because a previous process opened a different page in the same bank. In such a case the memory controller would have to first close (pre-charge) the bank containing the page, and open (activate) the correct page, before accessing its contents. The pre-charge time incurred by the process will affect both performance and power characteristics of the memory controller.

Consider for example a single-context system which has 2 processes ready to execute: A and B. If process A is executing on the system, it will likely own all the open pages in the Memory Controller during its time slice. At the end of its time slice, process A is context-switched out in favor of process B. In a conventional system, since process B is unlikely to access any pages belonging to process A, it will have to close those open pages belonging to process A, before it can open its own pages. The burden of cleaning up the pages after the context switch is thus left to process B; so process B pays an additional performance penalty. The overhead of closing the pages adds to the critical latency of the memory access by the later context.

BRIEF SUMMARY

One embodiment is a system for selectively closing pages of a process. The system comprises a signal receiver to receive a switch signal from an operating system. The switch signal indicates that a context switch, in which a first process is to be context-switched out of a first core, is imminent. The signal receiver also receives a core identifier to identify the first core to undergo the context switch. The system comprises a hardware implementation of a logical table. The table has rows corresponding to banks of memory and columns corresponding to cores. A bit set in a specific row and column indicates an open page of memory for the corresponding bank and core. A table controller, in response to the switch signal and to the core identifier, will unset a bit in a first column of the table corresponding to the identified first core and in a row indicating a first bank. Unsetting the bit indicates an open page is to close if there is no other bit set in the row. The table controller also is to set a bit in the table to indicate an open page when a memory access is received from a second process being executed in a second core. A pre-charger responsive to bits in the logical table will close a page in the bank for the first core if no other core is utilizing the page, as indicated by the table.

Another embodiment is a method to selectively opening and closing pages in banks of memory by way of a memory controller in a multi-core system. The method comprises receiving a switch signal from an operating system indicating that a context switch, in which a first process is to be context-switched out of a first core, is imminent. The memory controller also receives a core identifier to identify the first core to undergo the context switch. The method further comprises maintaining a table with rows corresponding to banks of memory and columns corresponding to cores, so that a bit set in a specific row and column indicates an open page of memory for the corresponding bank and core. In response to the switch signal and to the core identifier, the method comprises unsetting a bit in a first column of the table corresponding to the identified first core and in a row indicating a first bank, wherein unsetting the bit indicates an open page is to close if there is no other bit set in the row. Also, in response to a memory access of a second process being executed in a second core, the method comprises setting a bit in a second column of the table corresponding to the second core to indicate an open page.

Another embodiment is a computer program product comprising a computer useable medium having a computer readable code, wherein the computer readable code when stored in a memory of the computer and when executed by a processor of the computer causes the computer to selectively close open pages by way of a memory controller. The operations comprise receiving a switch signal from an operating system indicating that a context switch, in which a first process is to be context-switched out of a first core, is imminent. The operations further comprise receiving a core identifier to identify the first core to undergo the context switch. A table with rows corresponding to banks of memory and columns corresponding to cores is maintained so that a bit set in a specific row and column indicates an open page of memory for the corresponding bank and core. In response to the switch signal and to the core identifier, the computer causes the memory controller to unset a bit in a first column of the table corresponding to the identified first core and in a row indicating a first bank, wherein unsetting the bit indicates an open page is to close if there is no other bit set in the row. In response to a memory access of a second process being executed in a second core, the system sets a bit in a second column of the table corresponding to the second core to indicate an open page.

BRIEF DESCRIPTION OF THE SEVERAL VIEWS OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments depicted in the accompanying drawings. The example embodiments are described in detail. However, the amount of detail offered is not intended to limit the anticipated variations of embodiments; but, on the contrary, the intention is to cover all modifications, equivalents, and alternatives falling within the spirit and scope of the appended claims. The detailed description below is designed to render various embodiments obvious to a person of ordinary skill in the art.

Systems, methods and media for selectively closing pages in a memory in anticipation of a context switch are disclosed. In one embodiment, a table is provided to keep track of open pages for different processes. The table comprises rows corresponding to banks of memory and columns corresponding to cores of a multi-core processing system. When a context switch signal is received, the system unsets a bit in a column corresponding to the core from which the process is to be context-switched out. If no other process is using a page opened by the process the page is closed.

Figure 1:
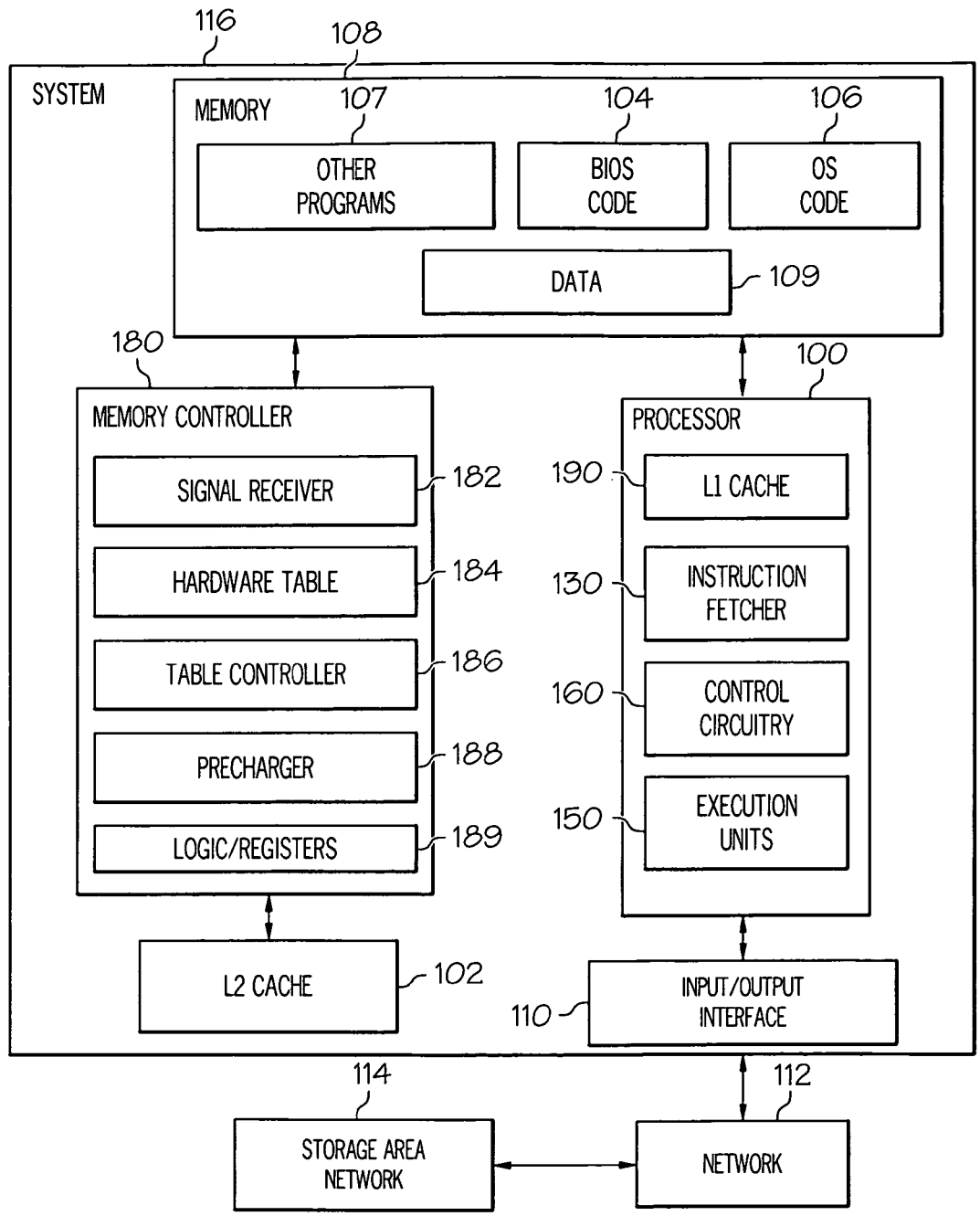
FIG. 1 depicts an embodiment of a computing system with a memory controller for selectively closing pages in a memory when a context switch is imminent.

FIG. 1 shows a system 116 (herein sometimes referred to as a computer, server, or machine.) System 116 can be, for example, a server or personal computer. System 116 comprises at least one processor 100 that can operate according to BIOS (Basic Input/Output System) Code 104 and Operating System (OS) Code 106. The BIOS and OS code is stored in memory 108. The BIOS code is typically stored on Read-Only Memory (ROM). In particular, the BIOS may be stored in flash ROM. The OS code is typically stored on the hard drive of system 116. Digital system 116 comprises a level 2 (L2) cache 102 located physically close to processor 100. Memory 108 also stores other programs 107 for execution by processor 100 and stores data 109. Note that although only one processor 100 is shown, a system 116 may comprise multiple processors.

Figure 2:
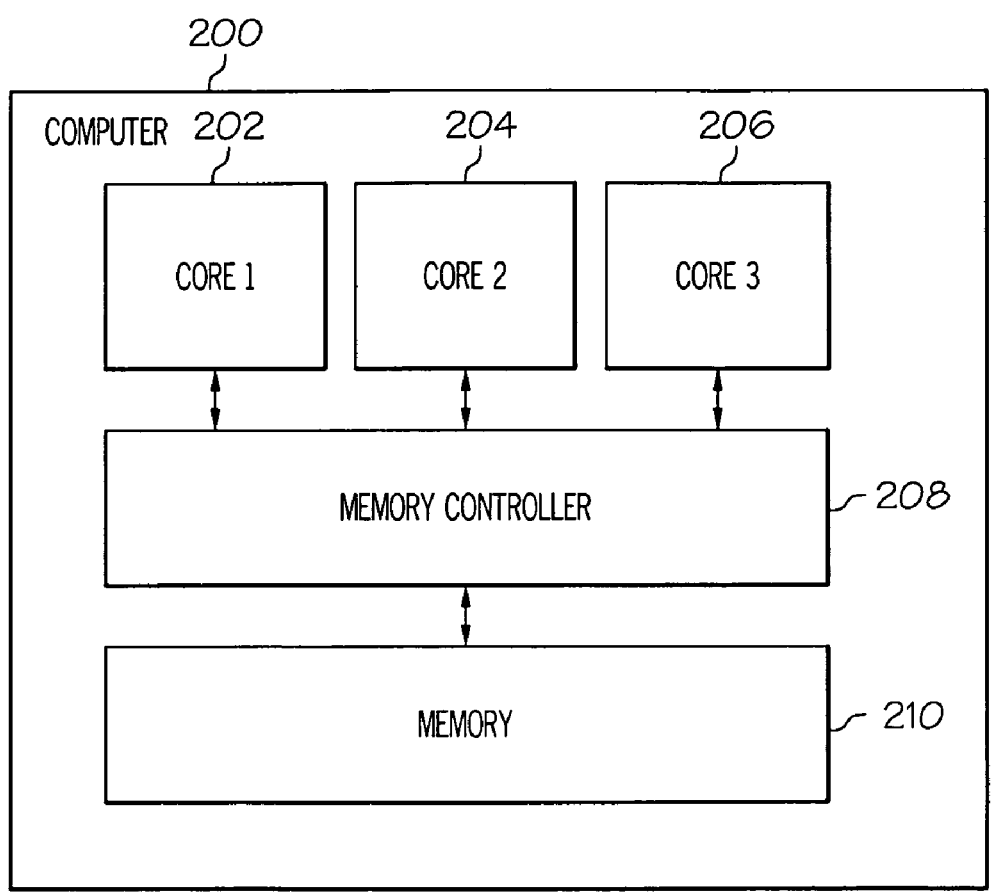
FIG. 2 depicts an embodiment of a multi-core processor with a shared memory controller.

In one embodiment, the Operating System (OS) 106 sends a signal to a memory controller (MC) 180 to indicate an impending context switch. In a single processor system, such as shown in FIG. 1, MC 180 may decide to close all open memory pages when the processor undergoes a context switch. This may also be done in a multicore system, such as shown in FIG. 2, where all the cores run independent execution threads at any given time, and, share the memory controller (MC). In such a multicore system, the Operating System sends a core identifier signal in addition to the signal that indicates a current or an impending context switch. The memory controller maintains a few bits for every open page, in a hardware table, to identify whether the memory page is being used by none, one, or more, of the cores. Upon a context switch, the memory controller uses the core identifier signal to close the pages opened by the process getting context switched out of that core, without closing the pages opened by a different core.

In one embodiment, the memory controller can decide whether it is worthwhile to implement this page-closing scheme or not, upon a context switch. This transfers the burden of "page cleanup" from the incoming process to the context switch routine. The scheme of closing open pages at context switch time is like a process cleaning up after itself. The reason it is attractive is because this cleaning up can be handled in the background by the memory controller, without slowing down the regular execution. Also, the implementation of this scheme is a performance optimization: it does not affect the correctness of execution.

Thus, system 116 also comprises a Memory Controller (MC) 180 to control access to memory 108. MC 180 comprises a signal receiver 182 to receive a switch signal from an operating system. The switch signal indicates that a context switch, in which a first process is to be context-switched out of a first core, is imminent. Signal receiver 182 also receives a core identifier to identify the first core to undergo the context switch. MC 180 comprises a hardware implementation 184 of a logical table. Table 184 has logical rows corresponding to banks of memory and logical columns corresponding to cores. A bit set in a specific row and column indicates an open page of memory for the corresponding bank and core.

A table controller 186, in response to the switch signal and to the core identifier, will unset a bit in a first column of the table corresponding to the identified first core and in a row indicating a first bank. Unsetting the bit indicates an open page is to close if there is no other bit set in the row. Table controller 186 also is to set a bit in the table to indicate an open page when a memory access is received from a second process being executed in a second core. A pre-charger 188 responsive to bits in the logical table will close a page in the bank for the first core if no other core is utilizing the page, as indicated by the table.

Figure 10:
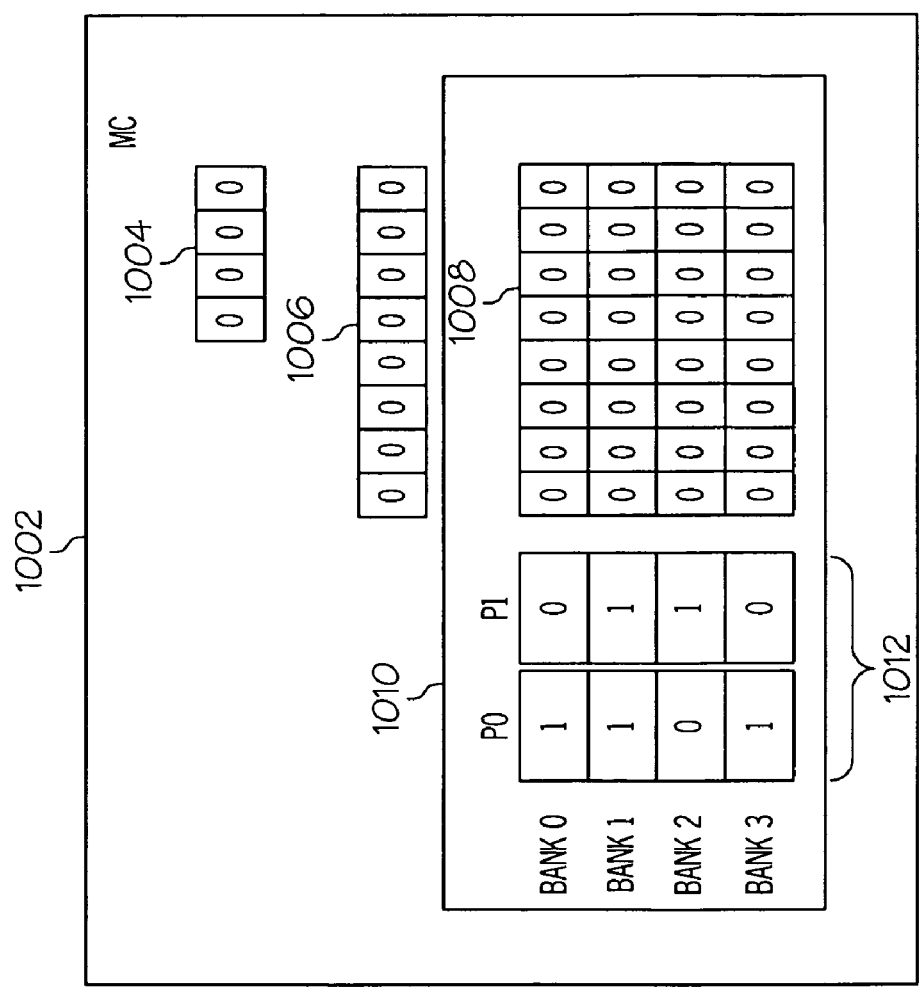
FIG. 10 depicts an embodiment of a memory controller with registers and logic to determine whether to close pages of a process being context switched out.

In some embodiments, MC 180 further comprises logic and registers 189 to control when the memory controller will operate either to close pages when a context switch is imminent or to leave pages open. FIG. 10 shows a memory controller according to these embodiments. Thus, MC 180 may further comprise a context identifier register 1008 associated with each row of the table to store a context identity number of a context which caused an open page by making a memory access. A context counter register 1006 increments at each context switch to associate a unique identification to each context switch. A pages-open counter 1004 increments when an accessed page is already open and decrements when an accessed page does not match a page already opened. MC 180 further comprises logic 189 to determine if the pages-open counter is greater than zero, and to close pages of the first core if the pages-open counter is not greater than zero, and to leave the pages open if the pages-open counter is greater than zero. This process will be explained in more detail below with reference to FIGS. 10, 11 and 12.

Processor 100 comprises an on-chip level one (L1) cache 190, an instruction fetcher 130, control circuitry 160, and execution units 150. Level 1 cache 190 receives and stores instructions that are near to time of execution. Instruction fetcher 130 fetches instructions from memory and brings the instructions into cache memory. Execution units 150 perform the operations called for by the instructions. Execution units 150 may comprise load/store units, integer Arithmetic/Logic Units, floating point Arithmetic/Logic Units, and Graphical Logic Units. Each execution unit comprises stages to perform steps in the execution of the instructions fetched by instruction fetcher 130. In a superscalar architecture, different execution units operate in parallel. Thus, execution units 150 comprise a set of units of different types operating in parallel to execute instructions to implement computer code.

Control circuitry 160 controls instruction fetcher 130 and execution units 150. Control circuitry 160 also receives information relevant to control decisions from execution units 150. For example, control circuitry 160 is notified in the event of a data cache miss in the execution pipeline to process a stall.

System 116 also typically includes other components and subsystems that are not shown in FIG. 1, such as: a Trusted Platform Module, random access memory (RAM), peripheral drivers, a keyboard, a color video monitor, one or more flexible diskette drives, one or more removable non-volatile media drives such as a fixed disk hard drive, CD and DVD drives, a pointing device such as a mouse, and a network interface adapter, etc. Processor 100 may also communicate with a network 112 by way of Input/Output Device 110. The network may connect system 116 with a storage area network (SAN) of physical memory storage devices 114. These devices may include, for example, tape drive storage or hard disk arrays or other types of memory.

Thus, in one mode of operation of system 116, the L2 cache receives, by way of memory controller 180, from memory 108, data and instructions expected to be processed in the processor pipeline of processor 100. L2 cache 102 is a fast memory located physically close to processor 100 to achieve greater speed. The L2 cache may receive from memory 108 the instructions for a plurality of instruction threads for one or more of a plurality of programs. Such instructions may include load and store instructions, branch instructions, arithmetic logic instructions, floating point instructions, etc. The L1 cache 190 is typically located as part of the processor 100 and contains data and instructions preferably received from L2 cache 102, again, by way of memory controller 180. Ideally, as the time approaches for a program instruction to be executed, the instruction is passed with its data, if any, first to the L2 cache, and then as execution time is near imminent, to the L1 cache. Typically, the closer to the processor the memory is, the more expensive it is and the faster it operates.

Execution units 150 execute the instructions received from the L1 cache 190. Each of the units of execution units 150 may be adapted to execute a specific set of instructions. Instructions can be submitted to different execution units for execution in parallel. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

A system 116 may be a server that has its own memory for storing its operating system, BIOS, and the code for executing application program and encryption key processing code, as well as files and data. As noted, the memory 108 of the system comprises Read-Only-Memory (ROM), cache memory implemented in DRAM and SRAM, a hard disk drive, CD drives and DVD drives. A server may also control access to other memory devices such as tape drives and hard disk arrays. Each server may store and execute its own application programs. Thus, some application programs, such as databases, may reside in a server and these programs may be available to computers in the network. Further, the server may be connected through one or more ports to a local storage area network (SAN). The SAN may comprise magnetic disks of differing types and speeds.

Figure 3:
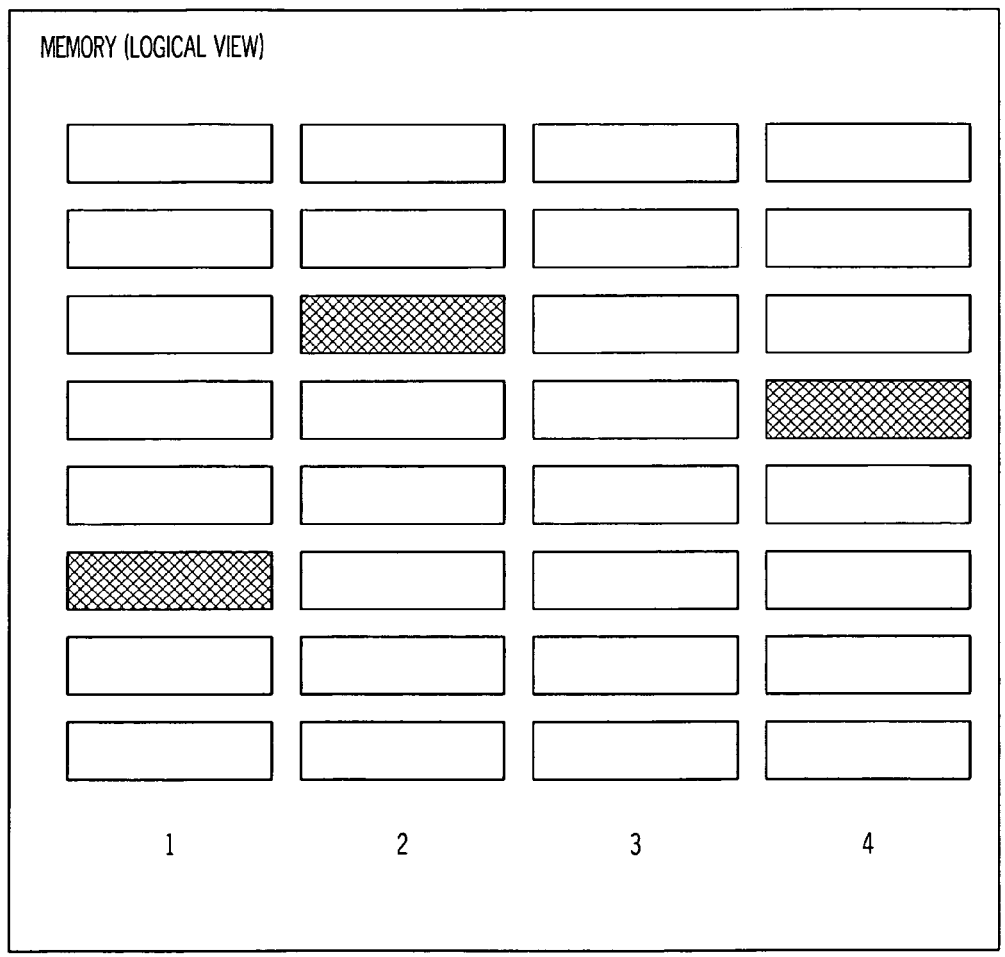
FIG. 3 depicts a logical view of a memory with open pages shaded in a single process system.

As FIG. 2 shows, a computer or server 200 may be a multiprocessor device with multiple cores, 202, 204, 206, each core having its own processor 100 as shown in FIG. 1. The cores share a common memory controller 208, which comprises elements shown for MC 180 in FIG. 1, and which can open and close pages in memory 210. In contrast, a single-context system is typically a uniprocessor, single-core system, where there is only one process, or alternatively, one context, running at any time. FIG. 3 shows a logical view of memory in one example of a single-context system. The memory is organized into 4 banks. Each bank has eight pages. All the blocks in FIG. 3 that are not shaded represent closed pages. All the blocks that are shaded represent open pages.

Since this is a uni-processor example, only one process runs at one time and therefore each open page belongs to the currently running process.

Figure 4:
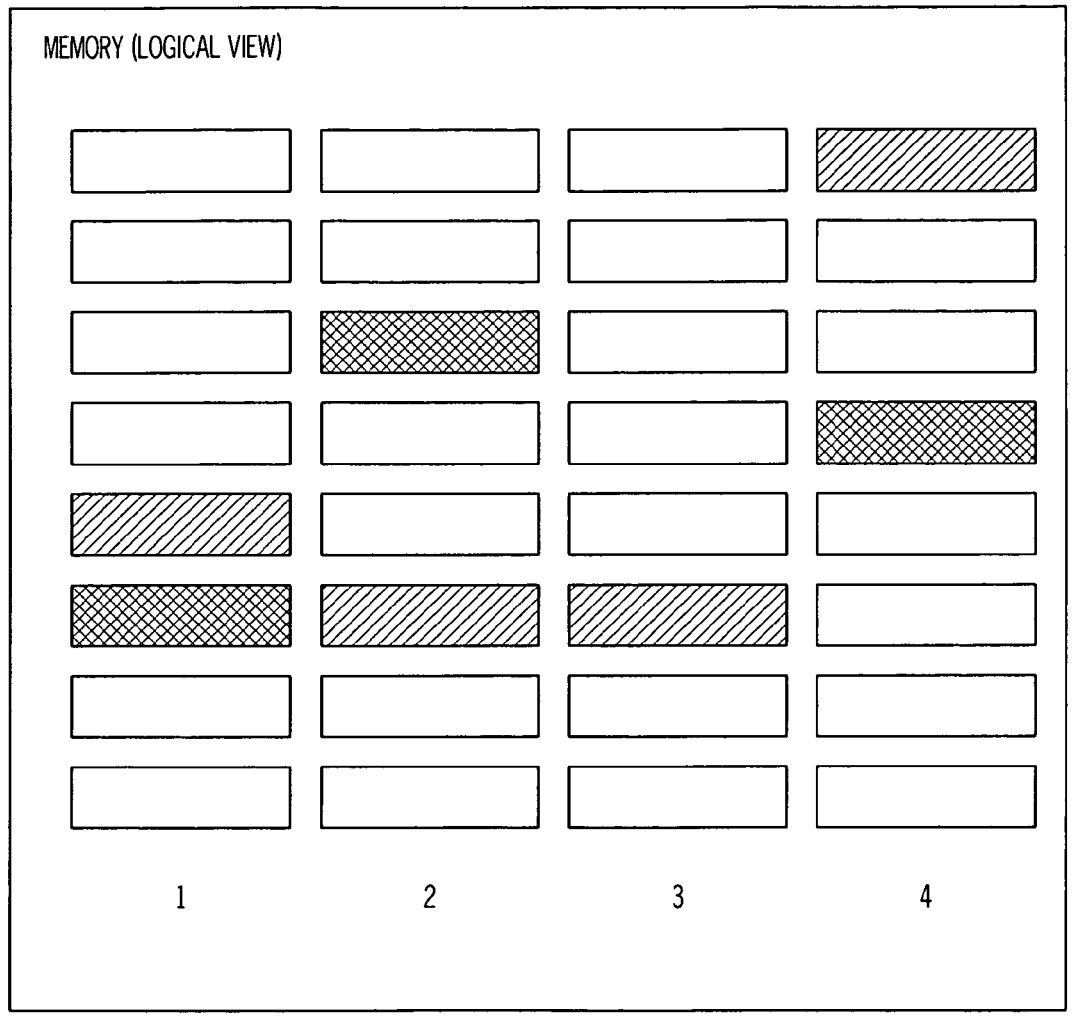
FIG. 4 depicts a logical view of memory showing open pages and pages that will be opened by an incoming process.

Consider as another example a single-context system which has 2 processes ready to execute: A and B. FIG. 4 shows this example. In FIG. 4 the darkly shaded blocks represent pages currently opened for process A. The more lightly shaded blocks represent closed pages likely to be opened for process B. The blocks that are not shaded represent other closed pages. If process A is executing on the system, it will likely own all the open pages in the Memory Controller during its time slice. At the end of its time slice, process A is context-switched out in favor of process B. In a conventional system, since process B is unlikely to access any pages belonging to process A, it will have to close those open pages belonging to process A, before it can open its own pages. The burden of cleaning up the pages after the context switch is thus left to process B; so process B pays an additional performance penalty. The overhead of closing the pages adds to the critical latency of the memory access by the later context.

Present embodiments avoid this performance penalty by allowing context switch "hints" or signals from the Operating System to the memory controller. The hint or signal can be provided to the MC using a message on the memory bus or using sideband interface. The Operating System (OS) notifies the MC of an impending context switch. This allows the MC to close all the open pages which belong to the exiting process. Using the same example of process A and B, when process A is about to be context-switched in favor of process B, the OS sends a hint to the MC about the context switch causing the MC to close all open pages. When process B eventually gets context switched in, it does not incur the penalty of closing the pages of process A. A main advantage of this approach is that each new context only needs to open pages, without spending the time to close any open pages. This is like a memory controller with an open page policy, except that at context switch time it switches to a closed page policy.

Figure 5:
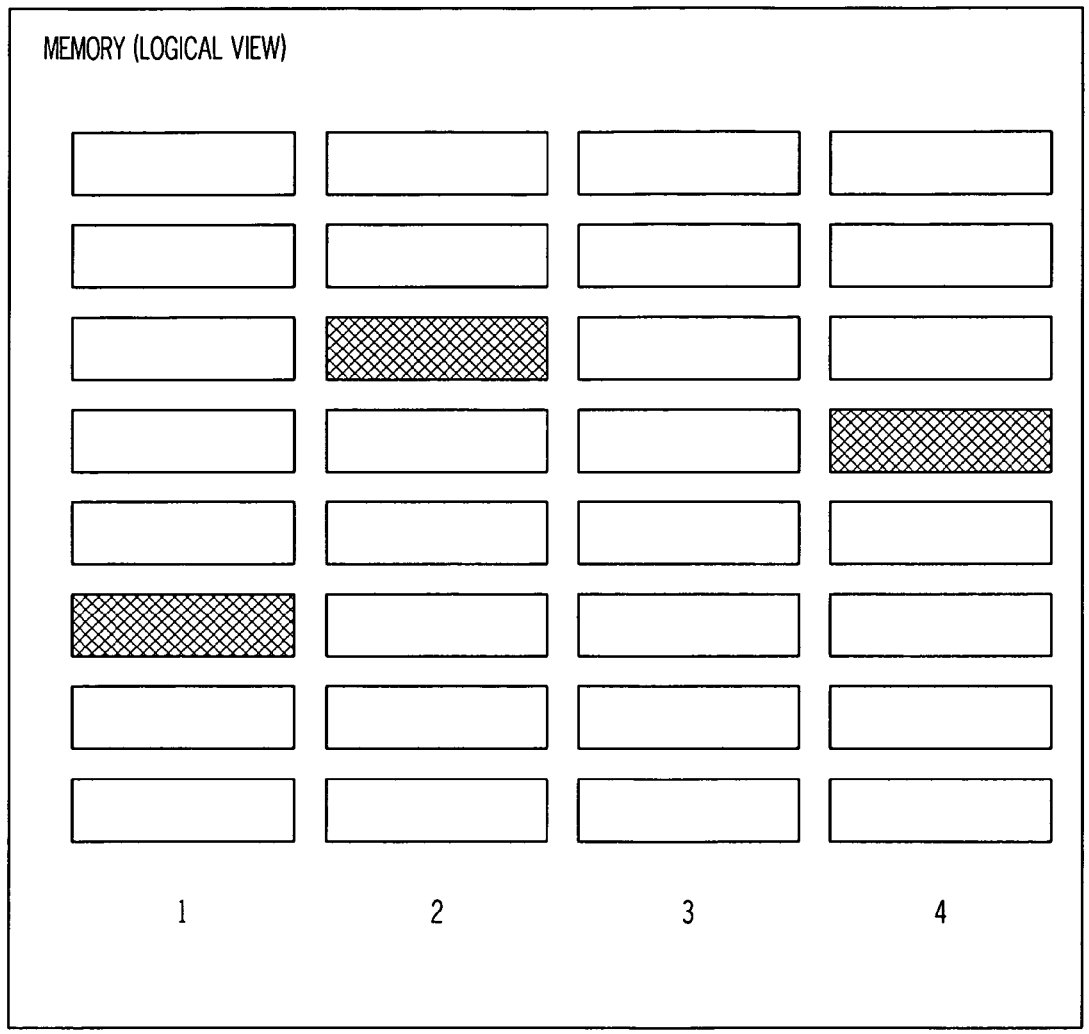
FIG. 5 depicts a logical view of memory showing open pages shaded for a single process in a multi-process system.

Multi-context systems are systems that allow multiple contexts to execute on the system at any given time. Examples of such systems include multi-core systems such as shown in FIG. 2. An example of memory allocation for a process in a multi-context system is shown in FIG. 5, where only one process has pages open. In FIG. 5, the blocks not shaded represent closed pages, and the shaded blocks represent open pages. In the multi-context system, the MC needs to be selective in which pages it closes. If multiple contexts simultaneously use the memory controller, the MC has to keep track of pages opened by specific contexts and closing only certain pages depending on the context. In a multicontext system, where the system executes one process on each core, an OS context switch could affect only one of the many cores. In such a scenario, closing all open pages in the memory could be detrimental to the processes running on cores which are not undergoing a context switch.

Therefore, multi-core embodiments are contemplated that, in addition to the signal provided by the OS to the MC that indicates an imminent context-switch, the OS also identifies the core which is undergoing the context switch. The memory controller maintains a hardware table, that may be called "Open-Page in-use by Context" table, or more simply, the Table, in which the MC keeps track of the owning/accessing core for each open page. This is easily determined because the MC receives the core identifier during a request to open a page. To maintain this hardware table, the memory controller needs only as many entries as there are physical banks in the system, and each entry contains as many bits as there are cores in the system.

Figure 8:
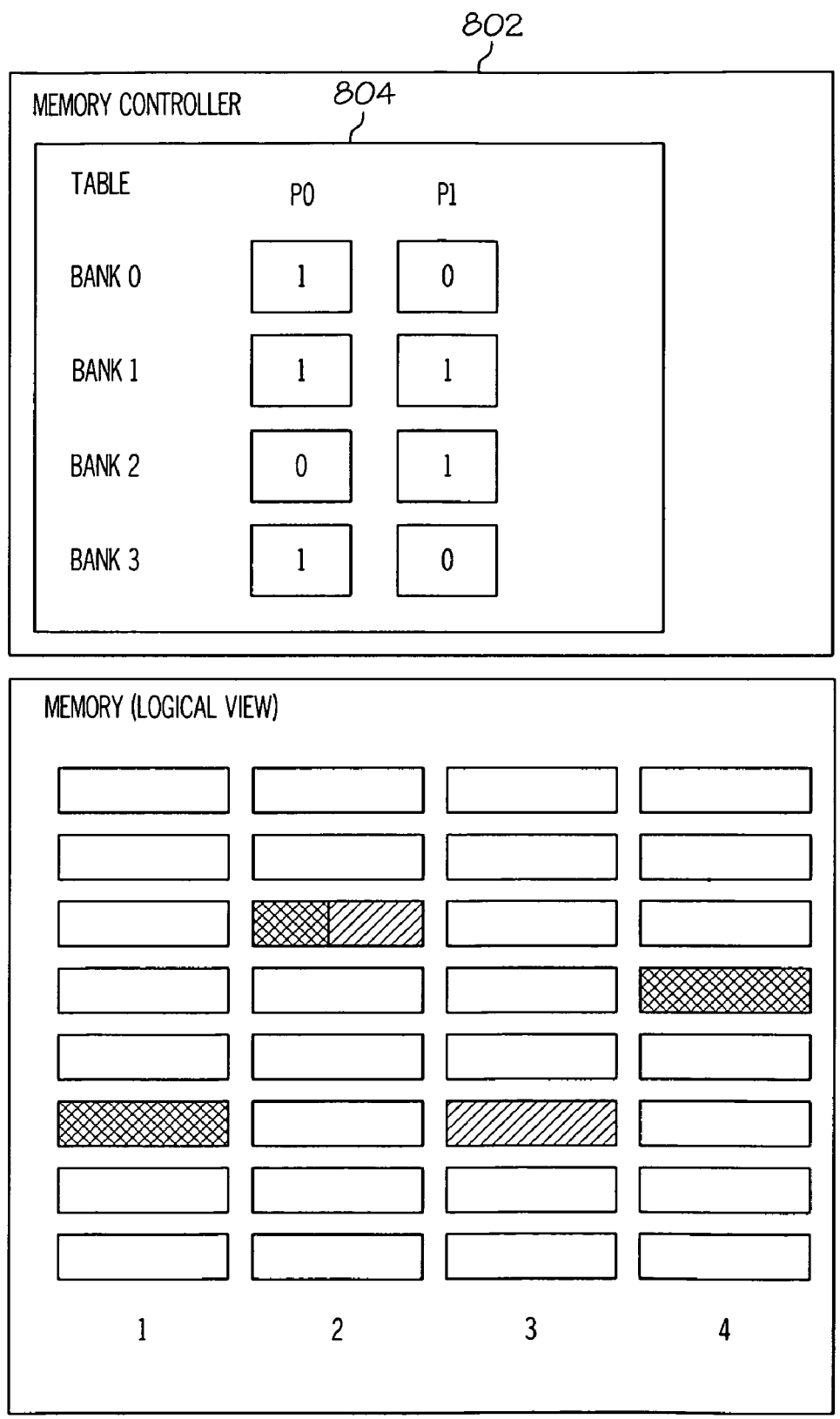
FIG. 8 depicts a logical view of memory showing open pages shaded and a corresponding table with bits set to indicate which pages are open for which core.

For example, for a system with 4 banks and 2 cores, the hardware table contains 4 2-bit entries. Table 804 of FIG. 8 shows an example of such a table. When a page is first opened in a bank, the bit corresponding to the core that requested the access is set in the entry corresponding to the bank. If a different core also requests access to the same page, the bit corresponding to that core is also set in the same entry. Therefore, more than one bit in the same entry could be simultaneously set. Thus, in row 2, corresponding to bank 1, two processes, one on core P0 and one on core P1, have requested a page in this bank and therefore the corresponding bits for both cores is set in row 2. In order for this to work, each request to the MC should identify which core caused this request.

Figure 6:
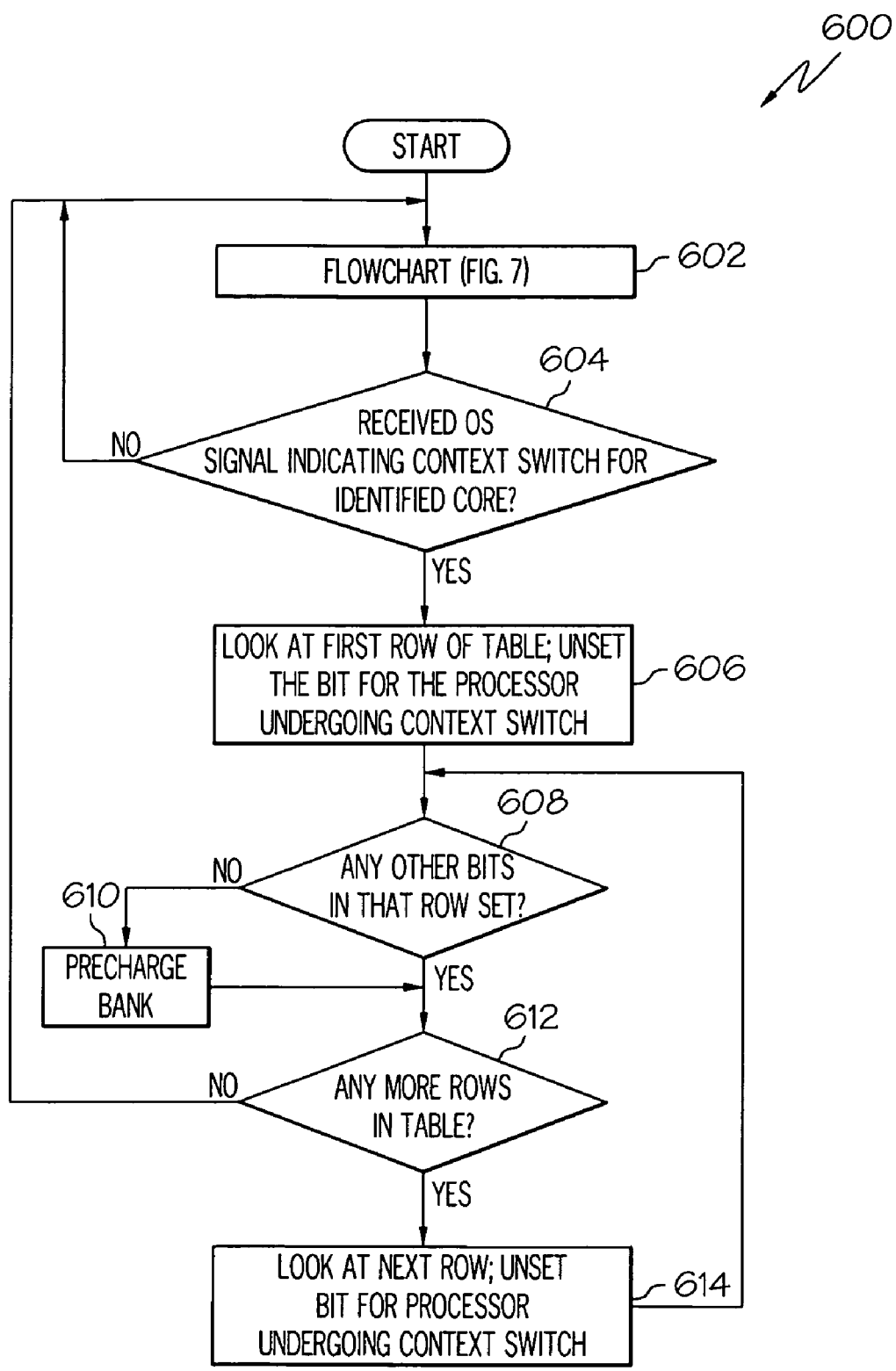
FIG. 6 depicts a flowchart of an embodiment for unsetting bits in a table of a memory controller.

The flowchart 600 of FIG. 6 describes the process of checking and unsetting bits in the "Open-Page in-use by Context" table. First, the Memory Controller (MC) while operating, executes the flowchart of FIG. 7, which will be described subsequently (element 602). During operation, the MC determines if it has received a signal from the Operating System (OS) indicating an imminent context switch for the identified core (element 604). If the MC has not received the signal from the OS, the process continues at element 602. If the MC has received the signal from the OS indicating an imminent context switch, then the MC examines the first row of the "Open-Page in-use by Context" table (element 606). A row corresponds to a bank, so that if there are 4 banks, for example, there would be 4 rows.

The MC unsets the bit for the processor undergoing the context switch. (Element 606). The MC then determines if any other bits in the row are set (element 608). If there are no other bits set in the row, the MC pre-charges the bank (i.e., closes the open page in the bank) (element 610). If there are other bits set in the row, the precharge step (element 610) is skipped and the MC determines if any more rows are in the table (element 612). If there are no more rows, the process continues (element 602). If there are more rows, the MC looks at the next row in the Table (element 614). The MC unsets the bit in the next row for the processor undergoing the context switch (element 614). Then the process continues at element (608).

Thus, when the OS indicates a context switch is happening for a certain core ID, the hardware table is traversed by the memory controller. If, for any of the entries, the bit corresponding to that core ID is set, the bit is unset. If that bit is the only bit in the row which is set, it indicates that the bank corresponding to the entry was in use only by that core. The bank is therefore pre-charged, i.e. the page is closed. If more than one bit in an entry corresponding to a bank is set, including the bit corresponding to this core ID, it indicates that the page is shared by processes running on multiple cores. The bank is not pre-charged but the bit corresponding to the core ID undergoing the context switch is, still, unset.

Figure 7:
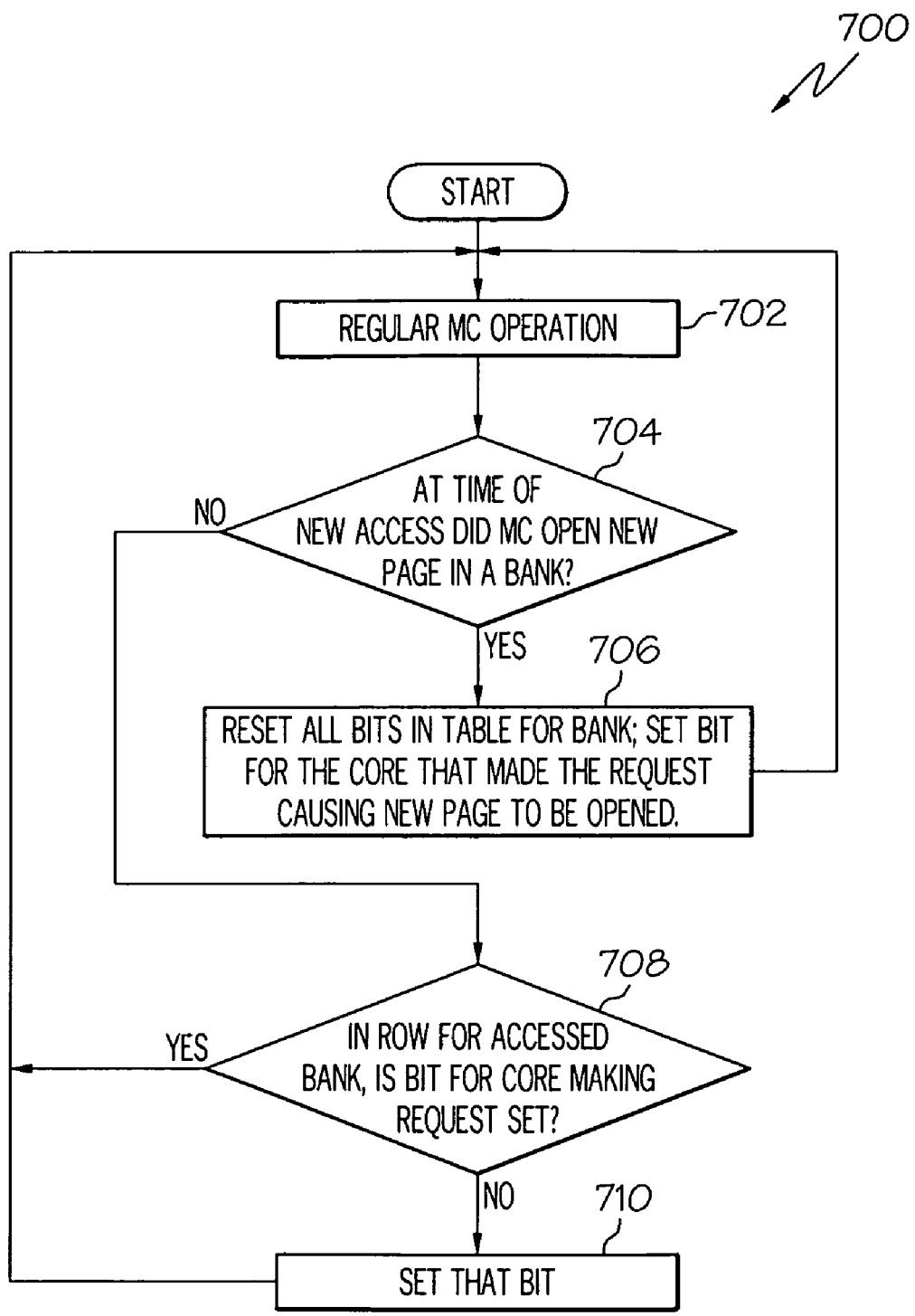
FIG. 7 depicts a flowchart of an embodiment for setting bits in a table of a memory controller.

The flowchart 700 of FIG. 7 describes the setting and unsetting of bits in the "Open-Page in-use by Context" table, and the associated bank pre-charge decision process. During regular MC operation (element 702), the MC determines if, at the time of a new access of memory, the MC opened a new page in a bank (element 704). If the MC did open a new page at the time of a new access, the MC then resets all bits in the "Open-Page in-use by Context" table corresponding to the bank (element 706). The MC then resumes its normal operation (element 702). If, however, at the time of a new access, the MC did not open a new page in the bank (element 704), then the MC determines if, in a row of the Table corresponding to the accessed bank, the bit for the core making the request is set (element 708). If so, the normal operation resumes (element 702). If the bit in the row of the Table corresponding to the accessed bit is not set for the core making the request, that bit is now set (element 710). Then normal operation resumes (element 702).

Consider the example of a two core system with core P0 and core P1 with a shared MC having 4 banks of memory as FIG. 8 shows. Suppose that processes A0, B0, C0 and D0 are alive on core P0 and processes A1, B1 and C1 are alive on core P1. Suppose A0 is scheduled on core P0 and A1 is scheduled on core P1. Suppose A0 is using 3 of the open pages (shown as darkly shaded blocks) and A1 is using 2 of the open pages (shown by lightly shades blocks), of which 1 is also used by A0. Banks holding the open pages in-use by A0 have a 1 in the bit-position corresponding to P0 in the "Open-Page in-use by Context" table 804 in the MC 802 hardware. Similarly, banks holding the open pages in-use by A1 have a 1 in the bit-position corresponding to P1 in the same table 804.

As FIG. 8 shows, Bank 0 has a 1 in the bit-position corresponding to P0, Bank 1 has a 1 in each bit position corresponding to P0 and P1, indicating that both the processes currently running on the two cores (processes A0 and A1) use the contents of the open page in Bank 1. The open page in Bank 2 is in use by process A1 running on P1 and the open page in Bank 3 is in use by the process A0 running on P0. When A0 is ready to be context-switched, the OS indicates to the MC 802 of an imminent context switch with core ID 0. This causes the MC to traverse the "Open-Page in-use by Context" table, identify the banks which have an open page in-use only by A0 (Bank 0 and Bank 3) and pre-charge them, thus closing the open pages in those banks.

Figure 9:
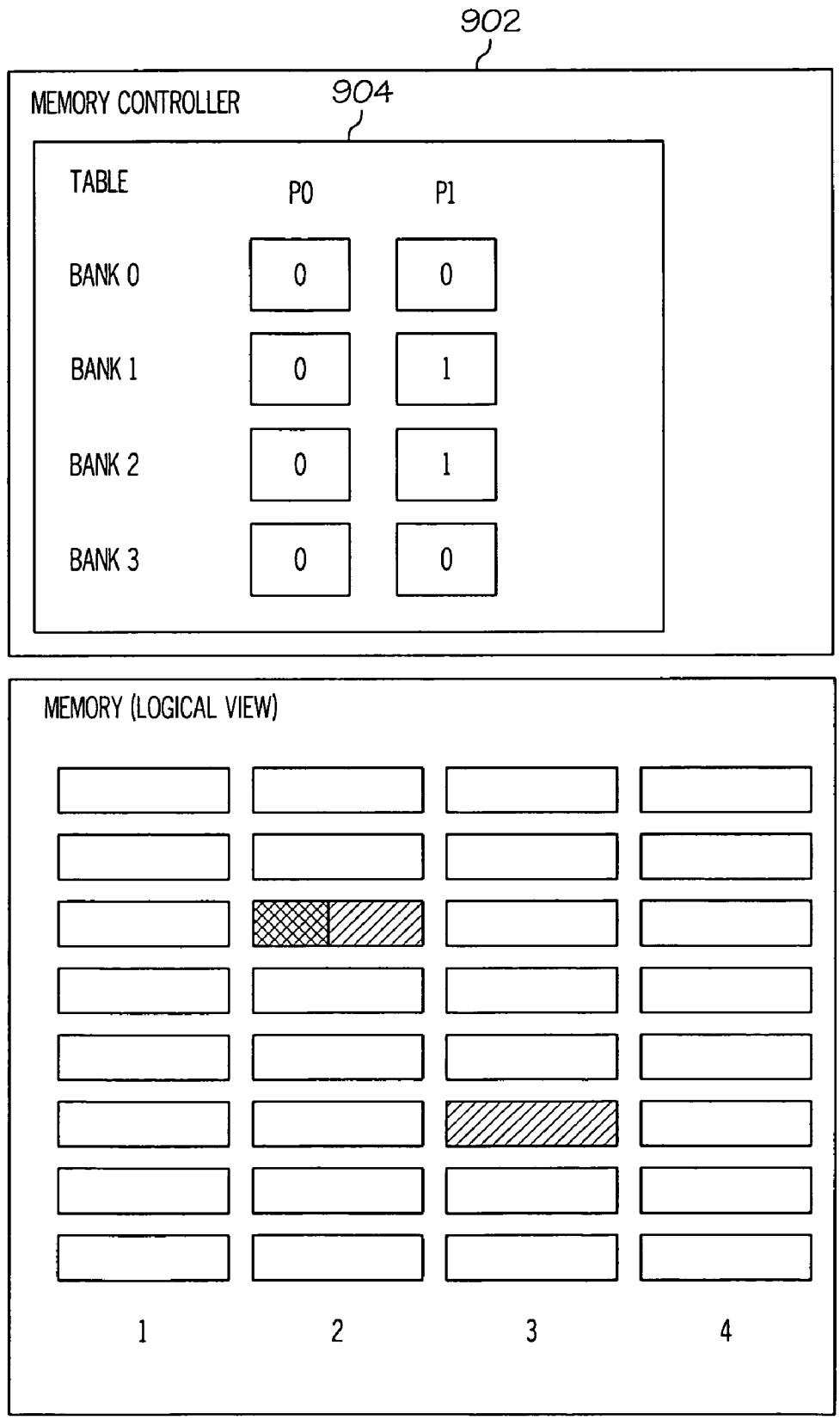
FIG. 9 depicts a logical view of memory showing open pages shaded and a corresponding table with bits set to indicate which pages are open and bits unset to show which pages are to be closed.

Bank 1 is not pre-charged because a currently executing process (process A1 on core P1), which is not context-switching out, also uses that page. The "Open-Page in-use by Context" table is also appropriately modified by unsetting the bits in the bit-position corresponding to P0 in Bank 1, Bank 2 and Bank 4. This is done because the currently executing process on P0 is context switching out, and therefore is not using any of the pages in any of the banks. Another way to think about this is, all the bits in the column corresponding to the context-switching core are reset to 0. After the context switch, the "Open-Page in-use by Context" table looks as shown in FIG. 9. The "Open-Page in-use by Context" table 904 of MC 902 now reflects that the open pages of process A0, which is being context switched out of core ID 0, are closed, except for the page that is also in use by process A1 being executed in core ID 1.

Thus, some embodiments comprise a method for selectively opening and closing pages in banks of memory by way of a memory controller in a multi-core system. The method comprises receiving a switch signal from an operating system indicating that a context switch, in which a first process is to be context-switched out of a first core, is imminent. The memory controller also receives a core identifier to identify the first core to undergo the context switch. The method further comprises maintaining a table with rows corresponding to banks of memory and columns corresponding to cores, so that a bit set in a specific row and column indicates an open page of memory for the corresponding bank and core. In response to the switch signal and to the core identifier, the method comprises unsetting a bit in a first column of the table corresponding to the identified first core and in a row indicating a first bank, wherein unsetting the bit indicates an open page is to close if there is no other bit set in the row. Also, in response to a memory access of a second process being executed in a second core, the method comprises setting a bit in a second column of the table corresponding to the second core to indicate an open page.

Some embodiments contemplate an extension to the memory controller that allows it to be self-regulating in its behavior concerning when to implement the page-closing-on-a-context-switch process described herein. These embodiments contemplate that a page may be left open across context switches and further contemplate that new contexts are unlikely to use pages opened by the exiting context. While some embodiments close pages of a context about to be switched out (except for pages shared by other contexts), other embodiments do this or alternately leave these pages open. These embodiments, determine when to optimally do one or the other, which will no be described.

Referring now to FIG. 10, the memory controller 1002 extends each entry in the "Open-Page in-use by Context" table 1010 it maintains, described above, by a small number of bits that maintain a context identifier 1008 for each bank. These are called the per-bank "Context Identifier" registers. The purpose of each "Context Identifier" register 1008 is to identify the context during which the page, which is currently open in the bank, was opened. Eight bits can identify context 0 through 255. A separate register, called the "Context Counter" register 1006, is maintained by the MC. Context counter register 1006 is the same size as each "Context Identifier" register, say 8 bits, and is used to maintain the current context number. It is incremented at each context switch and rolls over back to 0 after it reaches its upper limit of unique counts –255, with the 8-bit example.

The memory controller starts off in a mode where it does not close pages across context switches. When a new page is opened in a bank, the hardware table updates the context count of context counter 1006 to match the current context number. Whenever a page is accessed by a context and it matches an already open page and the context count corresponding to that bank in the hardware table does not match the current context register, that indicates that leaving a page open across context switches was useful. A separate "Leave Pages Open" counter 1004 is incremented by 1. Leave-page-open counter 1004 could be relatively small, say 4 or 8 bits wide. When a page accessed by a context does not match the page open in the bank, and the context count in that bank's entry in the "Open-Page in-use by Context" table does not match the current context number, that indicates that leaving the page open in that bank across contexts was a bad decision; it decrements the "Leave Pages Open" counter.

Figure 11:
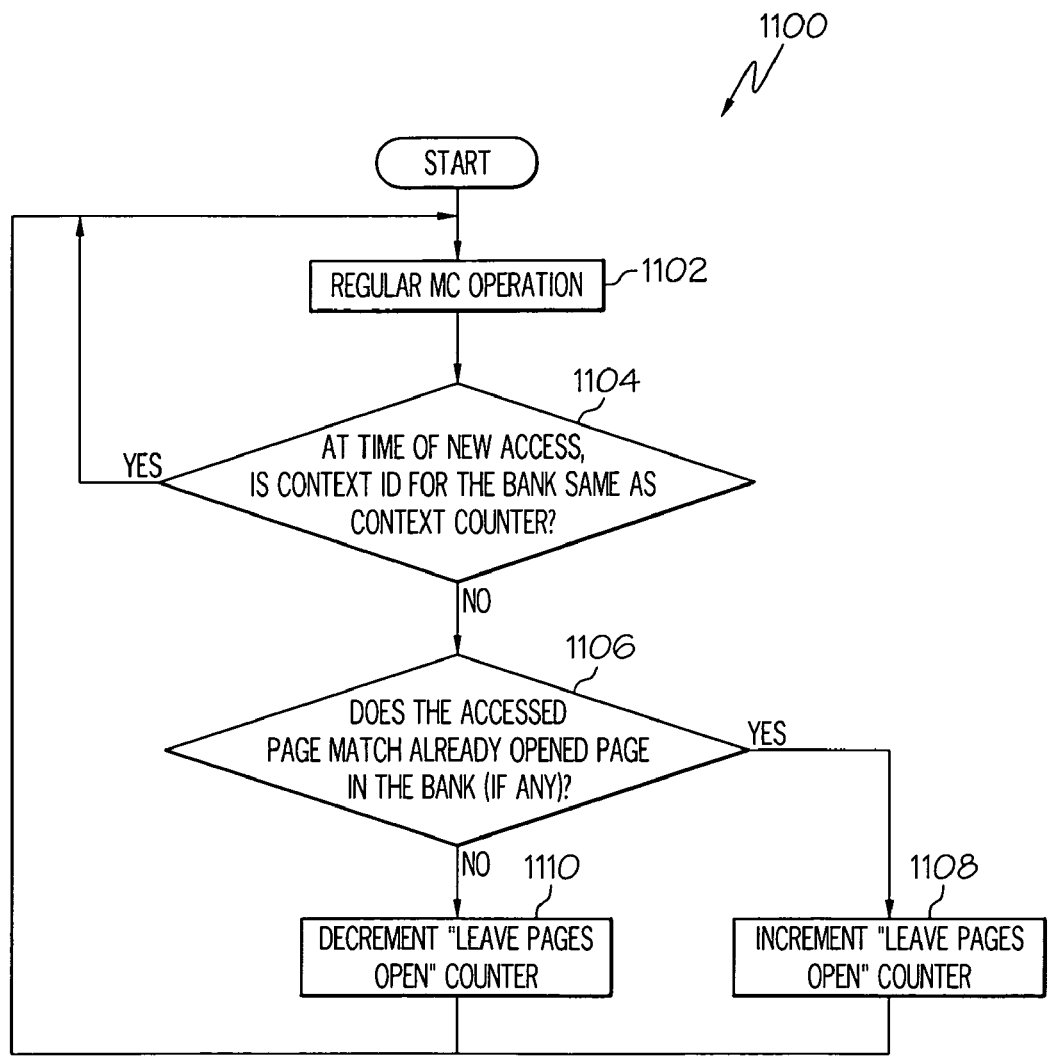
FIG. 11 depicts a flowchart of an embodiment for determining whether to increment or decrement a pages-open counter.

The flowchart 1100 of FIG. 11 shows this process of incrementing or decrementing the "Leave Pages Open" counter. During regular MC operation (element 1102), a new access may occur. The MC determines if, at the time of the new access, the context ID for the bank is the same as the context counter (element 1104). If the context ID is the same as the context counter, regular operation resumes (element 1102). If the context ID is not the same as the context counter, the MC determines if the accessed page matches a page in the bank that is already open (if any) (element 1106). If the accessed page matches an open page in the bank, the MC increments the "leave pages open" counter (element 1108). Otherwise, the MC decrements the "leave pages open" counter (element 1110). Then regular MC operation resumes.

Figure 12:
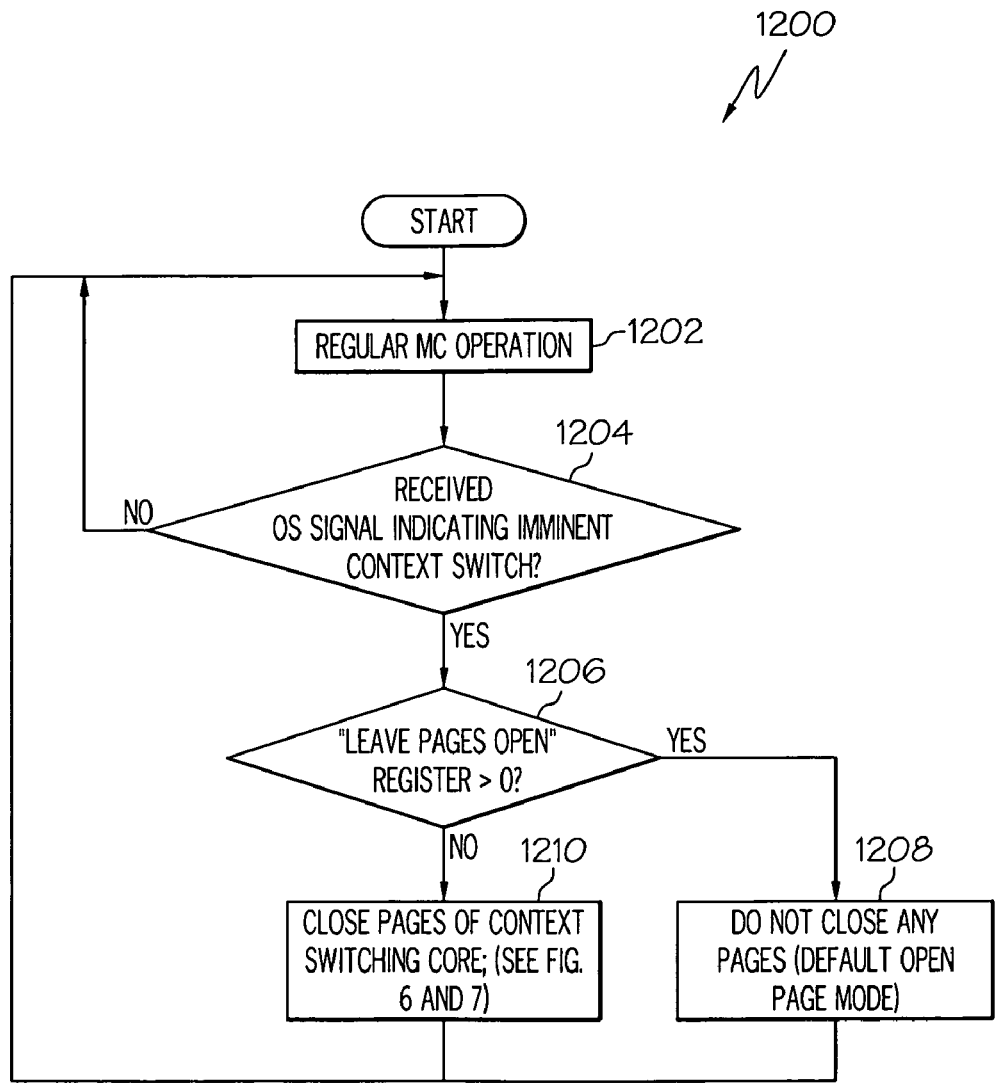
FIG. 12 depicts a flowchart of an embodiment for determining whether to close pages of a process being context switched out.

At the time of a context switch, if the "leave pages open" counter is positive, the pages are left open. If the "Leave Pages Open" counter is negative, the pages are closed at context switch time, as described earlier in this disclosure. The flowchart 1200 of FIG. 12 depicts this process of how to decide whether to continue in the default open page policy or to precharge banks. During regular MC operation (element 1202), the MC determines if it has received a signal from the operating system indicating an imminent context switch (element 1204). If the signal indicating an imminent context switch is not received, regular operation of the MC continues (element 1202). If the signal indicating an imminent context switch is received, then the MC determines if the "leave pages open" counter is greater than zero (element 1206). If the "leave pages open" counter is not greater than zero, the MC closes pages corresponding to the context switching core, as described in FIGS. 6 and 7 (element 1210). If the "leave pages open" counter is greater than zero, then the MC will not close any pages (element 1208). Thus, once the memory controller enters the mode where pages are closed upon a context switch, there is no further opportunity to increase the "Leave Pages Open" counter. Therefore, the system resets back to the regular mode of leaving pages open upon a context switch, periodically. It achieves this by periodically setting the "Leave Pages Open" counter to some small positive value.

Thus, some embodiments further comprise a method for determining when to either close pages or leave pages open. The method comprises associating a context identifier with each row of the table to store a context identity number of a context which caused an open page by making a memory access. The method comprises incrementing a context counter at each context switch to associate a unique identification to each context. The method further comprises incrementing a pages-open counter when an accessed page is already open and decrementing the pages-open counter when an accessed page does not match a page already opened. Finally, the method comprises determining if the pages-open counter is greater than zero, and closing pages of the first core if the pages-open counter is not greater than zero, and leaving the pages of the first core open if the pages-open counter is greater than zero.

Some embodiments can take the form of an entirely hardware embodiment or an embodiment containing both hardware and software elements. Some embodiments are thus implemented in software, which includes but is not limited to firmware, resident software, microcode, etc. Furthermore, embodiments can take the form of a computer program product accessible from a machine accessible readable medium providing program code for use by or in connection with a computer such as shown in FIG. 1 or FIG. 2, or any other instruction execution system.

For the purposes of this description, a machine accessible or computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a machine accessible medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory 108 employed during actual execution of the program code, bulk storage, and cache memories 102, 190, which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, another embodiment is a computer program product comprising a computer useable medium having a computer readable code, wherein the computer readable code when stored in a memory of the computer and when executed by a processor of the computer causes the computer to selectively close open pages by way of a memory controller. The operations comprise receiving a switch signal from an operating system indicating that a context switch, in which a first process is to be context-switched out of a first core, is imminent. The operations further comprise receiving a core identifier to identify the first core to undergo the context switch. A table with rows corresponding to banks of memory and columns corresponding to cores is maintained so that a bit set in a specific row and column indicates an open page of memory for the corresponding bank and core. In response to the switch signal and to the core identifier, the computer causes the memory controller to unset a bit in a first column of the table corresponding to the identified first core and in a row indicating a first bank, wherein unsetting the bit indicates an open page is to close if there is no other bit set in the row. In response to a memory access of a second process being executed in a second core, the system sets a bit in a second column of the table corresponding to the second core to indicate an open page.

Although the present invention and some of its advantages have been described in detail for some embodiments, it should be understood that various changes, substitutions and alterations in the described embodiments can be made herein without departing from the spirit and scope of the invention as defined by the appended claims. Although an embodiment described herein may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A memory controller, in an instruction execution system with one or more processing cores, for selectively opening and closing pages in banks of memory, comprising:
a receive mechanism configured to receive a switch signal from an operating system indicating that a context switch, in which a first process is configured to be context-switched out of a first core, is imminent, and configured to receive a core identifier to identify the first core to undergo the context switch;

a logical table with rows corresponding to banks of memory and columns corresponding to cores, so that a bit set in a specific row and column indicates an open page of memory for the corresponding bank and core; and a table controller, in response to the switch signal and to the core identifier, configured to unset a bit in a first column of the table corresponding to the identified first core and in a row indicating a first bank, wherein unsetting the bit indicates an open page is configured to close if there is no other bit set in the row; and wherein the table controller further is configured to set a bit in the table to indicate an open page when a memory access is received from a second process being executed in a second core.

2. The controller of claim 1, further comprising a precharger responsive to bits in the logical table to close a page in the bank for the first core if no other core is utilizing the page, as indicated by the table.

3. The controller of claim 1, further comprising:

a context identifier register associated with each row of the table configured to store a context identity number of a context which caused an open page by making a memory access; a context counter configured to increment at each context switch to associate a unique identification to each context;

a pages-open counter configured to increment when an accessed page is already open and to decrement when an accessed page does not match a page already opened; and logic configured to determine if the pages-open counter is greater than zero, and to close pages of the first core if the pages-open counter is not greater than zero, and to leave the pages open if the pages-open counter is greater than zero.

4. The controller of claim 3, further comprising a precharger responsive to bits in the logical table to close a page in the bank for the first core if no other core is utilizing the page, as indicated by the table.

5. The controller of claim 1, further comprising a mechanism configured to determine whether to close pages when a context switch is imminent, according to whether an accessed page is already open.

6. The controller of claim 1, wherein the logical table is implemented in hardware.

7. The controller of claim 1, wherein the table controller further comprises logic configured to determining whether to close pages of the first process in response to whether a page that is being accessed is already open.

8. A method for selectively opening and closing pages in banks of memory by way of a memory controller in a multi-core system, comprising:

receiving a switch signal from an operating system indicating that a context switch, in which a first process is to be context-switched out of a first core, is imminent;

receiving a core identifier to identify the first core to undergo the context switch;

maintaining a table with rows corresponding to banks of memory and columns corresponding to cores, so that a bit set in a specific row and column indicates an open page of memory for the corresponding bank and core;

in response to the switch signal and to the core identifier, unsetting a bit in a first column of the table corresponding to the identified first core and in a row indicating a first bank, wherein unsetting the bit indicates an open page is to close if there is no other bit set in the row; and in response to a memory access of a second process being executed in a second core, setting a bit in a second column of the table corresponding to the second core to indicate an open page.

9. The method of claim 8, further comprising closing a page in the bank for the first core if no other core is utilizing the page, as indicated by the table.

10. The method of claim 8, further comprising:

associating a context identifier with each row of the table to store a context identity number of a context which caused an open page by making a memory access;

incrementing a context counter at each context switch to associate a unique identification to each context;

incrementing a pages-open counter when an accessed page is already open and decrementing the pages-open counter when an accessed page does not match a page already opened; and determining if the pages-open counter is greater than zero, and closing pages of the first core if the pages-open counter is not greater than zero, and leaving the pages of the first core open if the pages-open counter is greater than zero.

11. The method of claim 10, further comprising, in response to bits in the logical table, closing a page in the bank for the first core if no other core is utilizing the page, as indicated by the table.

12. The method of claim 8, further comprising determining whether to close pages when a context switch is imminent, according to whether an accessed page is already open.

13. The method of claim 8, further comprising determining whether to close pages of a second process for a second core in response to a context switch signal to context-switch the second process out of the second core.

14. The method of claim 8, determining whether to close pages of the first process in response to whether a page that is being accessed is already open.

15. A computer program product comprising a non-transitory computer readable storage medium having a computer readable program encoded therewith, wherein the computer readable program when executed on a computer causes the computer to:

receive a switch signal from an operating system indicating that a context switch, in which a first process is configured to be context-switched out of a first core, is imminent;

receive a core identifier configured to identify the first core to undergo the context switch;

maintain a table with rows corresponding to banks of memory and columns corresponding to cores, so that a bit set in a specific row and column indicates an open page of memory for the corresponding bank and core;

in response to the switch signal and to the core identifier, unset a bit in a first column of the table corresponding to the identified first core and in a row indicating a first bank, wherein unsetting the bit indicates an open page is configured to close if there is no other bit set in the row; and in response to a memory access of a second process being executed in a second core, set a bit in a second column of the table corresponding to the second core to indicate an open page.

16. The computer program product of claim 15, further comprising to close a page in the bank for the first core if no other core is utilizing the page, as indicated by the table.

17. The computer program product of claim 15, further comprising:

associate a context identifier with each row of the table to store a context identity number of a context which caused an open page by making a memory access;

increment a context counter at each context switch to associate a unique identification to each context;

increment a pages-open counter when an accessed page is already open and decrement the pages-open counter when an accessed page does not match a page already opened; and determine if the pages-open counter is greater than zero, and close pages of the first core if the pages-open counter is not greater than zero, and leave the pages of the first core open if the pages-open counter is greater than zero.

18. The computer program product of claim 17, further comprising, in response to bits in the logical table, close a page in the bank for the first core if no other core is utilizing the page, as indicated by the table.

19. The computer product of claim 15, further comprising determining whether to close pages when a context switch is imminent, according to whether an accessed page is already open.

20. The computer program product of claim 15, further comprising determining whether to close pages of the first process in response to whether a page that is being accessed is already open.

* * * * *